United States Patent
Chan

(10) Patent No.: US 7,618,495 B2
(45) Date of Patent: Nov. 17, 2009

(54) METHOD FOR PICKLING A WORK STRING USING DISPERSED SOLVENT-IN-ACID FLUID DESIGN

(75) Inventor: Albert F. Chan, 1504 Glastonbury Dr., Plano, TX (US) 75075

(73) Assignee: Albert F. Chan, Plano, TX (US)

( * ) Notice: Subject to any disclaimer, the term of this patent is extended or adjusted under 35 U.S.C. 154(b) by 305 days.

(21) Appl. No.: 11/716,192

(22) Filed: Mar. 9, 2007

(65) Prior Publication Data

US 2008/0217018 A1    Sep. 11, 2008

(51) Int. Cl.
*B08B 3/04*    (2006.01)

(52) U.S. Cl. .................. 134/26; 134/10; 134/22.1; 134/22.11; 134/22.12; 134/22.19; 134/28; 134/30; 134/34; 134/36; 134/41; 134/42; 510/253; 510/421; 510/505

(58) Field of Classification Search .......... 134/10, 134/22.1, 22.11, 22.12, 22.14, 22.19, 26, 134/28, 30, 34, 36, 41, 42; 510/253, 421, 510/505
See application file for complete search history.

(56) References Cited

U.S. PATENT DOCUMENTS

| | | | | | |
|---|---|---|---|---|---|
| 3,613,789 | A | * | 10/1971 | Son, Jr. | 166/281 |
| 5,753,180 | A | * | 5/1998 | Burger | 422/7 |
| 5,885,364 | A | * | 3/1999 | Hieatt et al. | 134/22.11 |
| 5,977,032 | A | * | 11/1999 | Chan | 507/211 |
| 2002/0132740 | A1 | * | 9/2002 | Von Krosigk et al. | 507/200 |
| 2003/0102011 | A1 | * | 6/2003 | Smith et al. | 134/8 |

* cited by examiner

*Primary Examiner*—Sharidan Carrillo
(74) *Attorney, Agent, or Firm*—F. Lindsey Scott

(57) ABSTRACT

A method for cleaning a work string which may have been used to inject drilling muds, cement slurries, cement displacement materials and the like into a well where the work strong may contain drilling mud residues, cement slurry residues, cement slurry displacement materials, pipe thread lubricants, pipe dope and the like, as well as corrosion on the inside of the work string by injecting a dispersion slug into and recovering the dispersion slug from the work string.

10 Claims, 2 Drawing Sheets

US 7,618,495 B2

METHOD FOR PICKLING A WORK STRING USING DISPERSED SOLVENT-IN-ACID FLUID DESIGN

FIELD OF THE INVENTION

The present invention relates to a method for cleaning a work string which may have been used to pass drilling muds, cement slurries, cement displacement materials and the like into a well and which may contain pipe thread lubricants, pipe dope and the like, as well as corrosion on the inside of the work string.

BACKGROUND OF THE INVENTION

In the completion of wells for the production of fluids from subterranean formations, a work string is typically used. This work string may be used for drilling during which drilling muds, such as oil-based drilling muds, water-based drilling muds, and the like as well as completion fluids may have been passed through the work string. The work string may also have been used to position cement in an annulus between the outside of the casing and the inside of the well bore. The cement slurry is typically injected into the formation annulus after displacement of the drilling mud from the work string into the annulus. As a result of making up and breaking down the work string during the operations performed to complete the well, pipe thread lubricants, pipe dope and the like may also be found inside the work string. As a result any or all of drilling mud residue, cement slurry residue, oxidation products, pipe dope, pipe threat lubricants, inorganic scale materials, and other organic contaminants may be present in the work string.

After a well is complete, it is desirable to clean these materials from the work string. This is necessary since in future operations, such as the positioning of gravel packs and the like, it is highly undesirable that these materials be passed from the work string as contaminants into the gravel pack.

The use of acidic materials, such as aqueous hydrochloric acid, to pickle the work string is effective to remove some but not all of these components; specifically these acidic materials are effective in removing inorganic cement slurry scale and iron oxidation products, but are relatively ineffective with respect to pipe thread lubricants, pipe dope and any other organic materials which may be present.

Similarly, organic solvents which may be effective to remove the pipe thread lubricants, pipe dope and other organic materials are ineffective to remove other materials, such as inorganic cement scale, internal corrosion and the like.

It is highly desirable that a method and a composition be available for cleaning the interior of a work string by a single-pass circulation of a cleaning composition into and recovery of materials from the work string. Considerable effort has been directed to the development of such a method and composition.

SUMMARY OF THE INVENTION

It has now been found that a work string can be effectively cleaned by a method comprising: preparing a dispersion comprising an organic solvent blend and an aqueous acid; mixing the organic solvent blend and the aqueous acid to produce the dispersion of the organic solvent blend in the aqueous acid; injecting a dispersion slug into a top end of the work string; displacing the dispersion slug through the work string to near a bottom end of the work string; and, recovering the dispersion slug by reverse circulating the dispersion slug out of the work string.

The invention further includes a composition for cleaning a work string, the composition containing an organic solvent blend comprising at least one d-limonene, aliphatic alcohol and at least one ethoxylated alcohol dispersed in an aqueous acid.

BRIEF DESCRIPTION OF THE DRAWINGS

The FIG. 1 shows a diagram of a prior art work string positioned to inject gravel into a gravel pack to provide a sand control completion for production operations from a subterranean formation.

DESCRIPTION OF PREFERRED EMBODIMENTS

Figure 1:
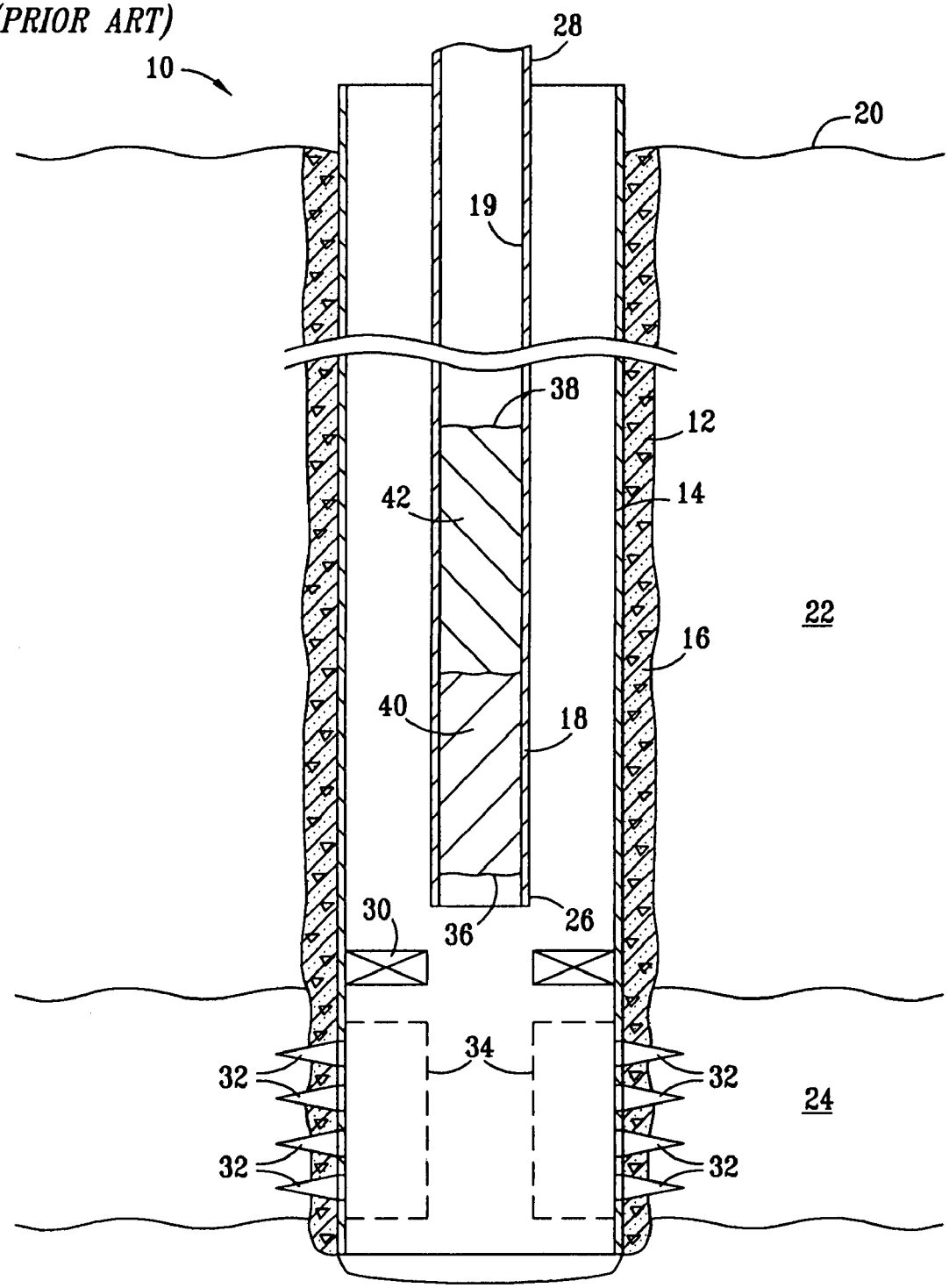

In the discussion of the invention, various pumps, wellhead equipment and the like required for the performance of the operations discussed have not been included since these components are well known to the art and their description is not necessary to the disclosure of the present invention.

According to the present invention, a work string is cleaned by preparing and injecting a dispersion slug comprising a dispersion of an organic solvent blend in an aqueous acid into a work string.

Hydrochloric acid is preferred although other inorganic and organic acids, such as sulfuric acid, formic acid, citric acid, acetic acid and the like, can also be used.

A suitable organic solvent blend comprises a blend of d-limonene-based organic solvents such as BP 101 (trademark of Deep South Chemical, Inc.) solvent marketed by Deep South Chemical, Inc., 229 Milestone Road, Broussard, La. 70518, or other commercial solvents marketed for the pickling of work strings and at least one aliphatic alcohol containing from about 3 to about 6 alkyl carbon atoms, and at least one ethoxylated alcohol surfactant containing from about 6 to about 12 alkyl carbon atoms and from about 1.5 to about 6 (preferably from about 2 to about 3) ethylene oxide groups. Preferably the organic solvent blend contains from about 2 to about 20 volume percent based upon the organic solvent blend of aliphatic alcohol and from about 0.05 to about 5% by volume of the ethoxylated alcohol surfactant based upon the organic solvent blend. A suitable aliphatic alcohol blend is BP 9846 (trademark of Deep South Chemical, Inc.) product marketed by Deep South Chemical, Inc. The combination of the organic solvent, at least one aliphatic alcohol and at least one ethoxylated alcohol surfactant is referred to herein as the organic solvent blend. Optionally the solvent blend may include at least one glycol ether mutual solvent, such as ethylene or propylene glycol ether-based mutual solvent.

The organic solvent blend may be any combination of organic materials which forms a dispersion with an aqueous pickling acid. While the organic solvent blend described above is effective, the method of the present invention is not so limited and any organic solvent blend which will form a suitable dispersion upon mixing with the aqueous acid and which is effective to remove pipe thread lubricants, pipe dope and the like from the inside of the work string is suitable.

The aqueous acid material is typically present with various additives, such as corrosion inhibitor and iron sequesterer, and may vary from about 40 to about 70 volume percent in the dispersion in practice. The acid concentration in the aqueous acid may vary from about 5 to about 30 active weight percent, but is desirably about 15 weight percent for hydrochloric acid. The percentages are varied for the other suitable acids.

Desirably the organic solvent blend and the aqueous acid are mixed in roughly equal proportions by volume, although variations in the proportions may be used. For instance, the dispersion may comprise from about 30 to about 60 volume percent and preferably from about 40 to about 50 volume percent organic solvent blend, with the aqueous acid comprising from about 40 to about 70 volume percent and preferably from about 50 to about 60 volume percent of the dispersion.

The aqueous acid may also include various additives, such as a corrosion inhibitor, a high temperature inhibitor aid and an iron sequestering agent. The use of such additives is well known in the art of pickling applications.

A quantity of the dispersion as described above is injected into the work string as a dispersion slug and is maintained in a dispersed state by injecting it at a pumping rate sufficient to maintain the dispersion. The dispersion slug may be injected into the work string at a pumping rate which will provide an equivalent flow velocity of about 100 to about 500 feet per minute. In any event, the flow velocity must be high enough to provide a flow turbulence equivalent to a Reynolds Number, $N_{re}$, from about 20,000 to about 100,000 (preferably ~50,000 and higher). Desirably the dispersion slug is not ejected from the bottom of the work string but is rapidly pumped into the work string to near the bottom of the work string and then removed from the work string by reverse circulating the spent dispersion slug out of the work string. The dispersion slug may be injected into the work string and reversed out of the work string with completion brine or seawater as a chase fluid, depending on what fluid is already present in the well. The composition should not be displaced out of a bottom end 26 of the work string into the well.

The organic solvent blend and the aqueous acid solution are mixed to produce a dispersion wherein the organic solvent blend is dispersed in relatively small droplets in the dispersion. More specifically, such droplets will coalesce and return to a clear organic solvent phase upon static standing for about 30 to about 300 seconds under ambient temperature conditions.

This method is effective to clean both the acid-soluble components, such as cement scales and iron oxidation products from the inside of the work string and the organic soluble components, such as pipe thread lubricants, pipe dope and the like from the inside of the work string.

Desirably the dispersion slug is injected to near the bottom 26 of the work string 18 which may be done by timing the pumping to a work string volume of the dispersion slug, to extend to within 100 feet from the bottom end 26 of the work string. At the conclusion of pumping, the dispersion slug may be reversed out with sea water or any other suitable completion brine or whatever is already present in the well. The spent dispersion slug, as recovered, will be discolored with materials removed from the inside of the work string and should be suitably neutralized and treated as a waste material. The dispersion slug initially injected is typically a light tan color.

In FIG. 1, a well 10 is positioned from an earth surface 20 into and through a subterranean formation 22. The well comprises a well bore 12 containing a casing 14, which is cemented in place by cement 16. The well is shown with casing 14 extending through a producing zone 24 with the casing being perforated by perforations 32 in producing zone 24. A work string 18 having an inside surface wall 19 is also shown in well 10. Work string 18 includes a first (top) end 28 and a second (bottom) end 26. Prior to the pickling procedure, the well is typically filled with completion brine or sea water.

In current industry pickling practice, a slug of the solvent 40 and a slug of aqueous acid 42 are injected in sequence into the work string via top end 28 of the work string and passed through the work string to a level 36 near bottom end 26 of the work string. The slugs, as shown, extend from a tail end 38 of the acid slug to a lead end 36 of the solvent slug. The two slugs are displaced through the work string by completion brine or sea water. After injection, the slugs are reversed out by pumping completion brine or sea water from the annulus through the work string to the surface. This results in passing the slugs back upwardly through the work string and out of top end 28. As mentioned previously, the equipment necessary to establish this reversal, as well as the injection, have not been shown. In the Figures, a packer 30 is shown for passage of the work string into the vicinity of a gravel screen 34 which is shown by schematically by dotted lines. In the positioning of gravel or the like in a gravel pack, it is highly desirable that materials such as pipe dope, pipe thread lubricants, cement scale, iron oxidation products and the like not be positioned in the gravel pack. These materials can obstruct the flow of fluids from producing formation 24. The object of positioning the gravel pack is to produce as much fluid as possible from producing formation 24 while restricting the flow of sand and other particulates from formation 24 into well 10. It is highly undesirable that the gravel pack be contaminated with materials which are typically found on the work string inner surface walls at this stage of the completion of the well.

Figure 2:
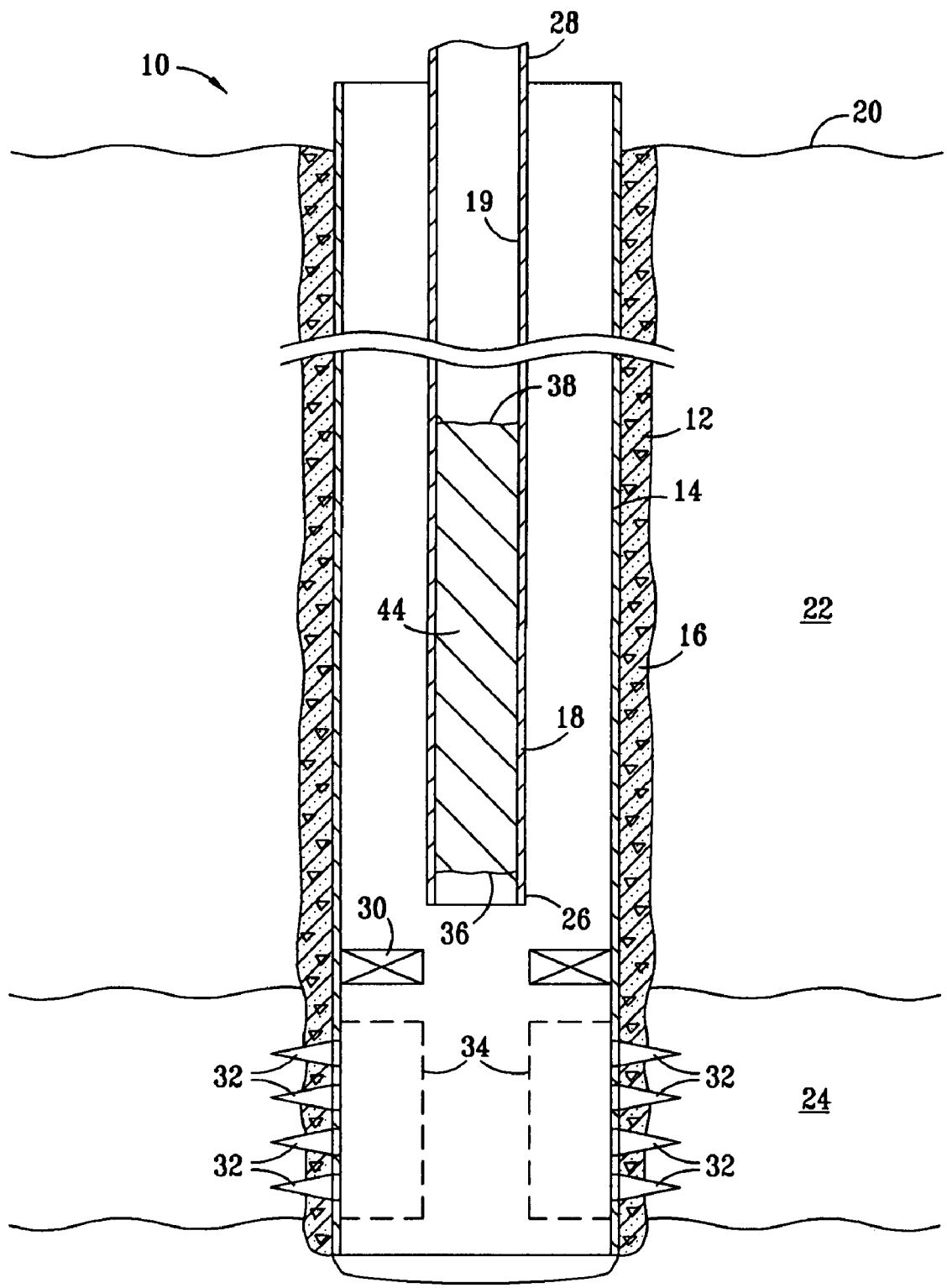
FIG. 2 shows a diagram of a work string positioned for cleaning of the work string prior to use of the work string to inject gravel into a gravel pack to provide a sand control completion for production operations from a subterranean formation.

In FIG. 2, an embodiment of the present invention is shown. The well arrangement shown is substantially the same as shown in FIG. 1 except that a dispersion slug 44 is positioned in work string 18 and extends to a leading edge 36 of the dispersion and a trailing edge 38 of the dispersion. Since the dispersion is effective to remove both the inorganic and organic materials along its entire length, it will be immediately apparent that the pipe is cleaned to a distance much nearer its lower end 28 than when two sequential slugs are used. In other words, with two slugs only the bottom slug is in contact with the bottom portion of the work string. While it functions to remove materials which can be removed with the solvent, if it is a solvent slug, or materials which can be removed by the acid, if it is an acid slug, the lower portion of the work string is not contacted by the second slug above the first slug. The use of two slugs which are injected separately and passed to near bottom 26 of work string 18 is much less efficient due to the formation of a viscous emulsion in the mixing interface due to incompatibility described below.

The use of the dispersion slug, as discussed in connection with FIG. 2, is a substantial improvement over the use of separate slugs.

There can be several drawbacks in a pickling process utilizing a sequential injection of two slugs, such as an organic solvent followed by an aqueous picking acid, for removal of both the organic-soluble components, such as pipe thread lubricants, pipe dope and the acid-soluble components, such as cement scales, and iron oxidation products, from inside of the work string.

For instance, such a pickling process incorporating two slugs does not allow aqueous picking acid to reach the bottom-most section of the work string, which is occupied by the organic solvent slug. This can leave a substantial length of the work string untreated for removal of cement scales and oxidation products. For instance, in a typical 3½ inch work string the untreated length of work string can be up to about 1400 feet per 10 barrels of organic solvent slug used.

Additionally, all aqueous pickling acid contains corrosion inhibitors which are surface-active in nature. Therefore there exists an incompatibility between the aqueous pickling acid and the organic solvent, especially within the temperature range of 40-50° F. above ambient temperature. Upon mixing aqueous pickling acid with organic solvent in various proportions, the mixture will form a viscous emulsion which renders the pickling acid and organic solvent functionless.

Further there is a significant density difference between aqueous pickling acid and organic solvent. For example, a 15 active weight percent of aqueous hydrochloric pickling acid has a density of 9.0 lb/gallon while the organic solvent typically has a density of 7.0 lb/gallon. Because of the density difference, the gravitational mixing between the heavier aqueous pickling acid slug with the lighter organic solvent slug will be significant in vertical and highly deviated wells, and therefore will increase the size of the emulsion volume at the interface. Since the aqueous pickling solvent can emulsify the organic solvent upon mixing, the large mixing interface between the two slugs will further diminish the effective function of both the organic solvent slug and the aqueous pickling acid in the pickling treatment of the work string.

The method and dispersion of the present invention can be used to clean other pipe surfaces, but the particular combination of contaminants in the work string is rarely found in other pipes. In instances where such materials are found or in instances where materials are found as contaminants which are partially soluble in aqueous acid in company with materials which are not partially soluble in aqueous acid but which are soluble in organic solvents, then the method of the present invention may be very useful.

It is important that the dispersion slug be injected and maintained as a dispersion by an adequate injection rate to maintain the dispersed state of the organic solvent blend/aqueous acid mixture as a dispersion. The dispersion comprises small droplets of the organic solvent blend in the aqueous hydrochloric acid with interfacial tension, preferably ranging from about 0.2 to about 20 dyne/cm. This allows each material to function independently to dissolve or otherwise interact with contaminates with which each material is effective. For instance, the thread lubricants and pipe dope are contacted with droplets of the organic solvent blend and interact with the droplets of the organic solvent blend. Similarly the acid interacts with the cement scale and iron oxidation materials which are interactive with the aqueous acid. An emulsified mixture of the organic solvent blend and the aqueous acid is not considered to be effective since it does not provide contact with either type of contaminant with either the organic solvent blend or the aqueous acid. The use of sequential slugs of the organic solvent followed by aqueous acid is also less effective since it provides less time for each of the materials to interact with contaminates with which the material can interact.

A major advantage of the present invention is the use of a single slug of a dispersion of organic solvent blend and aqueous acid solution which achieves the simultaneous removal of organic pipe dope contaminants and inorganic oxidation products (iron rust) and cement scales.

A further major advantage of the present invention is a unique dispersion system which comprises aqueous inorganic ($HCl$, $H_2SO_4$) or organic acid (formic, citric, acetic) commercial pipe-dope removal solvent products (such as, BP-101 solvent & Gold Flush solvent (trademark of Deep South Chemical Inc.) by Deep South Chemical, Safe-Solv E solvent (trademark of M-1 Swaco) by M-I SWACO, Super-Pickle solvent (trademark of Well-Flow) by Well-Flow and RC PDR-4000 solvent (trademark of Rig-Chem) by Rig-Chem et al and at least one aliphatic alcohol and at least one ethoxylated alcohol surfactant.

Current work string pickling procedures typically involve injecting a volume of organic solvent (10-15 bbls), followed by a volume of pickling hydrochloric acid (10-15 bbls). The two slugs are displaced with brine until the leading end of the solvent slug reaches the end of work string. The two slugs are then reversed out of the work string to complete the pickling process.

Note that the use of a dispersed system of organic solvent blend and aqueous acid allows contact with substantially the full length of the work string for pickling treatment, while the conventional pickling method using a sequential pumping of organic solvent slug and acid slug cannot achieve a similar result. Please note that acid slug 42 cannot contact the lower inside portion of the work string contacted by the solvent slug in the bottom-most portion of the work string.

A major flaw in such procedures is that since 10-15 bbls of solvent will occupy about 1,400-2,000 ft of work string length, the bottom-most work string will not see acid treatment for iron rust and cement scale removal. A further flaw is incompatibility between solvent and acid which contains corrosion inhibitor surfactants. The surfactants in acid tend to emulsify the solvent to form an emulsion, and render some of the solvent and acid useless in pickling process. Another flaw is the large density difference between solvent (7 ppg of density) and 15 weight percent HCl (9 ppg of density) which tends to enlarge the emulsified interface due to gravitational mixing between the solvent slug and the acid slug. This will further incapacitate the pickling slug's effectiveness due to formation of more emulsion at the interface.

By creating a single slug system which is a dispersion slug of an organic solvent blend and an aqueous pickling acid, a dispersant slug which provides efficient cleaning action for removal of both the organic pipe-dope contaminants and the iron oxidation and cement scale products by the simultaneous presence of solvent droplets and acid medium in the dispersion slug is provided. It also allows substantially full length treatment of a work string for removal of both pipe-dope and iron oxidation and cement scale products. It is also a simpler treatment utilizing only one slug instead of 2 slugs, and also benefits from a larger "apparent" slug volume by combining the two individual slugs.

The dispersion system typically contains about 40 to about 70 volume percent of aqueous inorganic ($HCl$, $H_2SO_4$) or organic acid (Formic, Acetic acid) and about 30 to about 60 volume percent of an organic solvent blend.

When mixed together under stirring action in a tank and pumped into a work string in turbulent flow, the organic solvent blend disperses into droplets in an aqueous acid medium. The dispersion will coalesce and separate into a solvent phase on top and an aqueous acid phase on the bottom upon static standing for about 30-300 seconds minutes under ambient temperature. The interfacial tension between these two separated phases is from bout 0.2 to about 20 dyne/cm. Furthermore, no emulsion is formed at the interface. The dispersability of the solvent in aqueous acid is determined by the time elapsed to obtain full separation of solvent and aqueous acid. Typically, the desirable separation time for the dispersion is between 60-150 seconds upon static standing at ambient temperature.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for cleaning a work string, the method consisting essentially of:
   a) preparing a composition consisting of an organic solvent blend and aqueous pickling acid, wherein the organic solvent blend consists of an organic solvent, at least one aliphatic alcohol containing from about 3 to about 6 carbon atoms and at least one ethoxylated alcohol surfactant;
   b) mixing the composition to produce dispersed droplets of the organic solvent blend in the aqueous acid to produce a slug of a non-emulsified dispersion;
   c) injecting the slug of the dispersion into a top of the work string;
   d) displacing the dispersion slug through the work string to near a bottom of the work string; and,
   e) recovering the dispersion slug by reverse-circulating the dispersion slug out of the work string through the top of the work string.

2. The method of claim 1 wherein the dispersion slug consists of from about 40 to about 70 volume percent of the aqueous pickling acid and from about 30 to about 60 volume percent of the organic solvent blend.

3. The method of claim 1 wherein the aliphatic alcohol is present in an amount from about 2 to about 20 volume percent based upon the organic solvent blend.

4. The method of claim 1 wherein the ethoxylated alcohol surfactant is present in an amount from about 0.05 to about 5.0 volume percent based upon the organic solvent blend.

5. The method of claim 1 wherein the dispersion slug is injected at a rate sufficient to maintain the dispersion.

6. The method of claim 1 wherein the dispersion slug is injected into the work string at a fluid velocity from about 100 to about 500 feet per minute, with a flow turbulence equivalent to a Reynolds Number of 20,000 to 100,000.

7. The method of claim 1 wherein the dispersion slug is displaced toward the bottom of the work string with completion brine or sea water.

8. The method of claim 1 wherein the mixing is continued during injection.

9. The method of claim 1 wherein the aqueous pickling acid is selected from the group consisting of hydrochloric acid, sulfuric acid, formic acid, citric acid and acetic acid.

10. The method of claim 1 wherein the aqueous pickling acid is hydrochloric acid.

* * * * *